US006168829B1

(12) United States Patent
Russ et al.

(10) Patent No.: US 6,168,829 B1
(45) Date of Patent: Jan. 2, 2001

(54) DOUBLE FACED TAPE WITH REPOSITIONAL ADHESIVE

(75) Inventors: Timothy J. Russ, North Tonawanda; Francis R. Smith, Niagara Falls, both of NY (US)

(73) Assignee: Moore Business Forms, Inc., Grand Island, NY (US)

( * ) Notice: Under 35 U.S.C. 154(b), the term of this patent shall be extended for 0 days.

(21) Appl. No.: 08/006,517

(22) Filed: Jan. 21, 1993

(51) Int. Cl.[7] .................................................. C09J 7/02
(52) U.S. Cl. ................................. 427/208.4; 427/208.8; 428/41.8; 428/354; 428/355 RA
(58) Field of Search ............................ 428/40, 354, 355, 428/41.8, 355 RA; 427/208.4, 208.8

(56) References Cited

U.S. PATENT DOCUMENTS 2,206,899 * 7/1940 Kellgren .
4,215,432 * 8/1980 Smith .
4,554,193 * 11/1985 Erickson ........................... 428/354
4,599,265 * 7/1986 Esmay ............................... 428/354
4,839,206 * 6/1989 Waldenberger ................... 438/354
4,942,071 * 7/1990 Frye .................................. 428/354
5,130,185 * 7/1992 Ness .................................. 428/354

* cited by examiner

Primary Examiner—Jenna Davis
(74) Attorney, Agent, or Firm—Nixon & Vanderhye P.C.

(57) ABSTRACT

A double sided tape has repositional with adhesive associated with a first face. The tape may be in the form of a roll, and the adhesive on the second face may be either repositional or permanent. In order to facilitate rolling, a release liner is provided on one of the adhesive faces. The tape may have perforations, notches, or slits along its length to facilitate detachment of predefined lengths of the tape, as from a dispenser. A tie coat may be applied to each of the faces of the substrate before the adhesive is applied. One face of adhesive can be readily applied to one object (e.g., a shelf or a piece of paper), while the repositional adhesive is then available to removably attach that object to another object (e.g., another piece of paper).

10 Claims, 2 Drawing Sheets

DOUBLE FACED TAPE WITH REPOSITIONAL ADHESIVE

BACKGROUND AND SUMMARY OF THE INVENTION

Pads of paper with repositional adhesive applied to one of the faces are an extremely popular items for both office and household use. The utility of such a product is, of course, in the use of the repositional adhesive which allows attachment—though readily releasable—to a wide variety of surfaces, and objects, including other pieces of paper. Some consumers, however, would like to be able to use the same principles for attachment of pieces of paper, or other objects, that are other than those commercially supplied from vendors of pads with repositional adhesive, such as 3M and Moore Business Forms. According to the present invention, this highly desirable goal is accomplished by construction of a double sided tape which can be applied to any object, such as a piece of paper, providing to that object the same benefits as are provided by commercially available pads.

According to one aspect of the present invention, a method of making a double sided tape is provided. The method comprises the following steps: (a) Applying a first adhesive coat to an elongated tape substrate first face. (b) Applying a second adhesive coat to the substrate second face. (c) At least one of steps (a) and (b) being practiced to apply a repositional adhesive. (d) Applying a release liner to the first adhesive to provide a tape. And then, (e) rolling the substrate into a roll with the second adhesive engaging the release liner.

There typically is also the further step (prior to step (e)) of making spaced separation-facilitating manifestations in the tape to allow ready detachment of lengths of substrate, adhesive and release liner from each other. Both steps (a) and (b) may be practiced to apply repositional adhesive, or a permanent adhesive may be applied in the practice of one of steps (a) and (b). Also, a tie coat may be provided to the first and second (or one of the other) faces of the substrate prior to application of the adhesive thereto to facilitate adherence of the adhesive to the substrate.

The invention also comprises a double faced tape. The double faced tape comprises: An elongated tape substrate having first and second faces. First and second adhesives operatively associated with the first and second faces, at least one of the adhesives comprising a repositional adhesive; and a release liner applied to one of the first and second adhesives. A tie coat may be provided between at least one of the first and second adhesives and the first and second substrate faces. Both adhesives may be repositional or one may be permanent. Also, spaced separation-facilitating manifestations, such as perforations, slits or notches, may be disposed along the length of the tape to allow ready separation of portions of the tape from each other. Desirably, the tape is in roll form, with a second adhesive on top of a release liner (which covers the first adhesive), in a spiral configuration.

According to another aspect of the present invention, there is provided a method of using a double sided tape having first and second faces with adhesive on both faces, including repositional adhesive on the first face. The method comprises the steps of: (a) applying the second adhesive to a first object so that the second adhesive extends outwardly from the first object; and (b) causing a second object to releasably come into contact with the first adhesive, and ultimately removing the second object from contact therewith.

Where the second adhesive is permanent adhesive, step (a) is practiced to permanently affix the tape to a fixed object, such as a shelf, furniture edge or a piece of paper. Where both adhesives are repositional, there is the further step of readily removing the tape from the first object and applying it to a third object. A release liner is typically provided on tape covering one of the adhesives, and thus there is the further step of removing the release liner prior to the practice of one or both of steps (a) and (b). Desirably, the tape is in roll form and there are the further steps of (c) unrolling the tape from the roll, and (d) separating a length of tape from the roll. Step (d) is preferably practiced by separating the tape along predefined, spaced, separation-facilitating manifestations (such as perforations) along its length.

It is a primary object of the present invention to allow the desirable features of pads with stick-on adhesive to be applied to numerous other office and household products and uses. This and other objects of the invention will become clear from an inspection of the detailed description of the invention and from the appended claims.

DETAILED DESCRIPTION OF THE DRAWINGS

Figure 1:
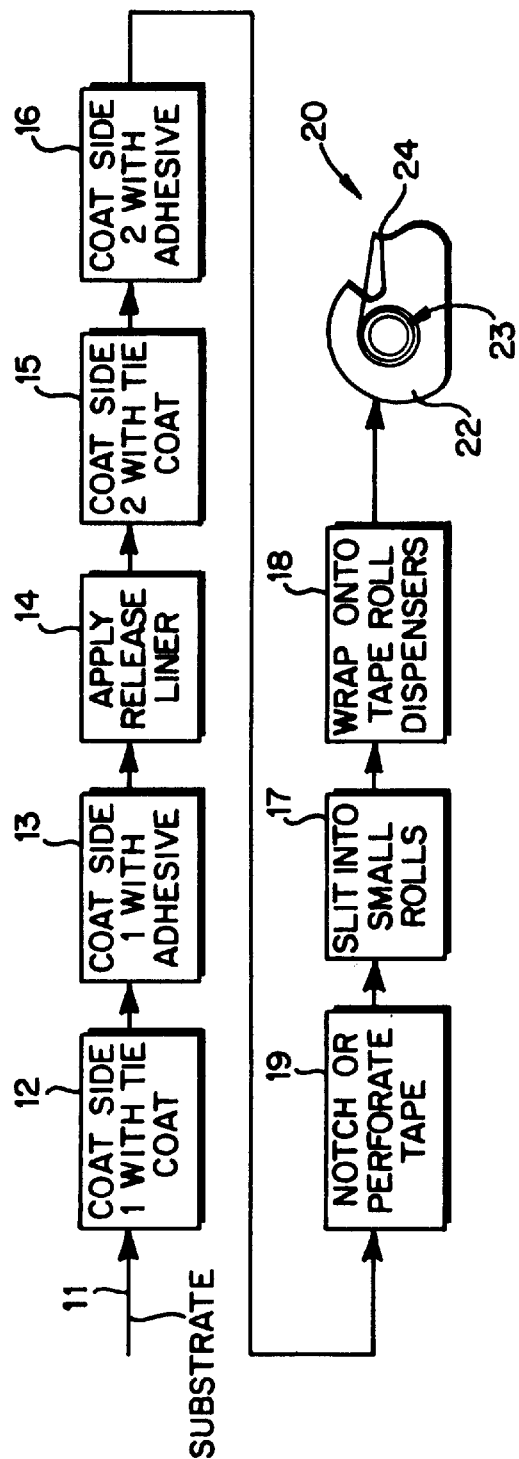
FIG. 1 is a box diagram showing exemplary method steps for the production of a double sided tape according to the present invention.

FIG. 1 schematically illustrates the production of double sided tape according to the present invention. The method is practiced utilizing a substrate 11, which may be paper (e.g., 20 lb. paper), cloth, plastic (e.g., transparent plastic material), or the like.

The substrate 11, in web form, is fed to the first stage 12 where, optionally, the first face thereof is coated with a tie coat. A tie coat is utilized if necessary or desirable to ensure that the adhesive and the substrate bond tightly together so that the adhesive will not separate from the substrate 11. One particular example of a tie coat used with a positional adhesive is shown in copending application Ser. No. 07/912, 851, filed Jul. 2, 1992, the disclosure of which is hereby incorporated by reference herein.

After the first face of the substrate 11 is coated with a tie coat, it then passes to stage 13 where it is coated with a first adhesive, and then typically it passes to the stage 14 where a release liner is applied to the adhesive. Then, the substrate 11 passes to the stage 15 where the tie coat is optionally applied to its second face, then to stage 16 where the tie coat on the second face is coated with a second adhesive. The tape ultimately passes to conventional equipment 17 which slits it into narrower width rolls, and then it may pass to step 18 where the rolls are put into dispensers. Optionally, there is the step 19, prior to step 18 (typically between the step 16 and 17) of providing spaced separation-facilitating manifestations in the tape (e.g., perforations, notches or slits) to allow ready detachment of predefined lengths of tape from the rest of the roll.

Shown schematically in FIG. 1 is one exemplary product 20 may be produced utilizing the method illustrated in FIG.

1. The product includes a dispenser 22 having a tape roll 23 thereon, and a serrated edge or like separation facilitating structure 24 at one end of the dispenser 22.

Figure 2:
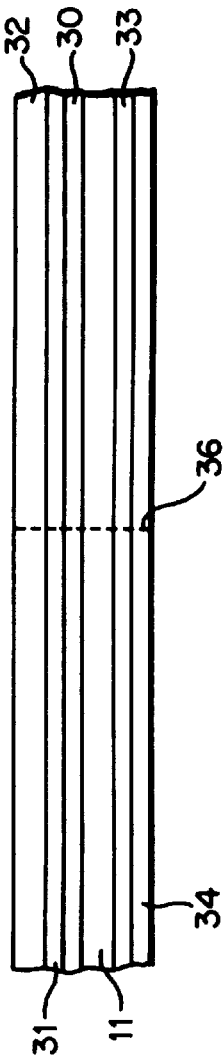
FIG. 2 is a schematic side view with the sides of the components greatly enlarged for clarity of illustration, of an exemplary double sided tape according to the invention.

FIG. 2 illustrates an exemplary double sided tape 29 according to the invention. On the first face of the substrate 11 is a tie coat 30, and the first adhesive 31, covered by a release liner 32. On the second face of the substrate 11 is a second tie coat 33, covered by the second adhesive 34. Perforation lines 36 provide for ready separation of the tape portions on either side thereof. One or both of the adhesives 31, 34 are repositional adhesive, such as that sold by Moore Business Forms, Inc., with its Note Stix® pad products, or that sold by 3M with its PostIt® pad products. Instead of both adhesives 31, 34 being repositional, there are some circumstances where one is permanent.

Figure 3:
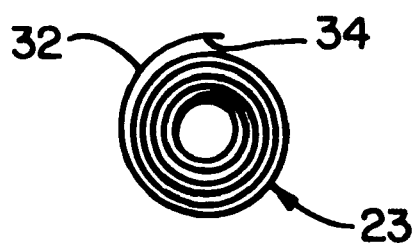
FIG. 3 is a schematic side view of the tape of FIG. 2 shown in roll form.

It is highly desirable to provide the tape 29 in roll form (23), as illustrated in FIGS. 1 and 3. In roll form (23), the second adhesive 34 on one portion of the tape engages the release liner 32 on another portion of the tape, so that those portions do not stick together when wound up in the spiral configuration illustrated in FIGS. 1 and 3. The exact nature of release liner 32 will be varied to be dependent upon the degree of tackiness of the tape adhesive with which it will come in contact.

Figure 4:
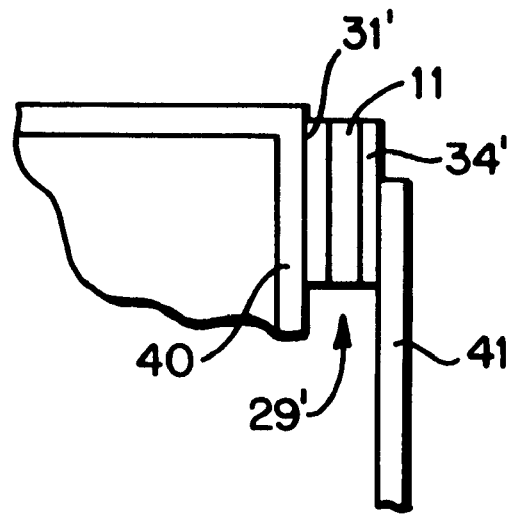
FIG. 4 is a side view showing the utilization of the modification of the tape of FIG. 2 shown attaching two objects together.

The tape 29 according to the invention desirably includes the tie coats 30 and 33, but they may not be essential depending upon the particular chemical nature of the adhesives, and the particular substrate 11 utilized. FIG. 4 shows a double sided tape 29' according to the invention in which the substrate 11 has the first and second adhesive coats 31', 34', respectively, applied directly thereto, i.e. without a tie coat.

FIG. 4 also schematically illustrates a desirable use of the double sided tape according to the invention. According to a method of the present invention, the double sided tape 29' (after removal of the release liner, such as the release liner 32) from one adhesive layer thereof, the first adhesive 31' is applied to a first object. In FIG. 4 the first object is illustrated by reference numeral 40 as a shelf, or furniture edge, although it also may be a piece of paper. The second, repositional, adhesive 34' then faces outwardly and is available to readily removably receive a second object, such as the piece of paper 41. The piece of paper 41 may be easily applied to the adhesive 34', then readily removed, and another piece of paper applied in its place, or the piece of paper 41 reapplied. Where the adhesive 31' is permanent, the tape remains as illustrated in FIG. 4 for a long period of time, and can only be removed by scraping, a solvent, or the like. Where the adhesive 31' is repositional, then the tape 29' also may be readily removed.

When removing the tape 29, 29' from a dispenser 20, it may be readily separated along the manifestations (e.g., perforations) 36. Those manifestations (e.g., perforations) 36 may be spaced along the length of the tape 29 to correspond to the average width of adhesive paper (or a common fraction of the length thereof) that is common for paper that would be utilized with the invention.

It will thus be seen that according to the present invention a method and product are provided for the ready manufacture and utilization of the desirable qualities of repositional adhesive with "make your own" products.

While the invention has been described in connection with what is presently considered to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making a double sided tape comprising the steps of:

(a) applying a first adhesive coat to an elongated tape substrate first face;

(b) applying a second adhesive coat to the substrate second face;

(c) at least one of steps (a) and (b) being practiced to apply a repositional adhesive;

(d) applying a release liner to the first adhesive to provide a tape, the release liner being the only release liner associated with the tape; and then (e) rolling the substrate into a roll with the second adhesive engaging the release liner; and wherein one of steps (a) and (b) is practiced to apply a permanent adhesive.

2. A method as recited in claim 1 comprising the further step, prior to step (e), of providing spaced separation-facilitating manifestations to the tape to allow ready detachment of lengths of substrate, adhesive and release liner from each other.

3. A method as recited in claim 1 wherein both steps (a) and (b) are practiced to apply repositional adhesive.

4. A method as recited in claim 1 comprising the further steps of applying a tie coat to the first and second faces of the substrate prior to application of the adhesive thereto.

5. A method as recited in claim 1 wherein step (a) is practiced to apply repositional adhesive.

6. A method as recited in claim 1 wherein step (b) is practiced to apply repositional adhesive.

7. A method as recited in claim 3 comprising the further step of applying a tie coat to at least one of the first and second faces of the substrate before applying the adhesive thereto.

8. A double faced tape comprising:

an elongated tape substrate having first and second faces, and in roll form;

first and second adhesives operatively associated with said first and second faces, at least one of said adhesives comprising a repositional adhesive;

a release liner applied to one of said first and second adhesives, and only one of said adhesives, said release liner being the only release liner associated with the tape; and a tie coat provided between each of said substrate faces and said adhesives; and wherein one of said adhesives is a permanent adhesive.

9. A double faced tape as recited in claim 8 wherein both said first and second adhesives are repositional adhesives.

10. A double faced tape as recited in claim 9 further comprising spaced separation-facilitating manifestations disposed along the length of said tape to allow ready separation of portions of the tape from each other.

* * * * *